United States Patent
Choi et al.

(10) Patent No.: US 11,518,822 B2
(45) Date of Patent: Dec. 6, 2022

(54) METHOD OF PREDICTING FOULING IN POLYOLEFIN PREPARATION PROCESS

(71) Applicant: LG Chem, Ltd., Seoul (KR)

(72) Inventors: Seung Won Choi, Daejeon (KR); Eun Jung Joo, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 17/051,884

(22) PCT Filed: Nov. 5, 2019

(86) PCT No.: PCT/KR2019/014922
§ 371 (c)(1),
(2) Date: Oct. 30, 2020

(87) PCT Pub. No.: WO2020/101247
PCT Pub. Date: May 22, 2020

(65) Prior Publication Data
US 2021/0122838 A1 Apr. 29, 2021

(30) Foreign Application Priority Data
Nov. 12, 2018 (KR) .................. 10-2018-0138395

(51) Int. Cl.
C08F 2/01 (2006.01)
C08F 210/16 (2006.01)

(52) U.S. Cl.
CPC .............. *C08F 2/01* (2013.01); *C08F 210/16* (2013.01)

(58) Field of Classification Search
CPC ...... C08F 2/01; C08F 210/16; C08F 4/65927; C08F 2/002; C08F 4/65916; C08F 4/65912; C08F 210/14; C08F 2500/12
USPC ........................................................ 526/64
See application file for complete search history.

(56) References Cited

U.S. PATENT DOCUMENTS

| | | | |
|---|---|---|---|
| 6,072,576 A | 6/2000 | McDonald et al. | |
| 7,381,777 B1 | 6/2008 | Towles et al. | |
| 2006/0045823 A1 | 3/2006 | Shaw et al. | |
| 2007/0036692 A1 | 2/2007 | Lewalle | |
| 2010/0105849 A1 | 4/2010 | Eisinger et al. | |
| 2010/0324738 A1 | 12/2010 | Lewalle | |
| 2012/0022692 A1* | 1/2012 | Hendrickson | G05B 23/0254 700/266 |
| 2012/0046426 A1 | 2/2012 | Fang | |
| 2013/0261344 A1 | 10/2013 | Miller et al. | |
| 2014/0142261 A1* | 5/2014 | Burton | C08F 4/65908 526/121 |
| 2014/0378629 A1 | 12/2014 | Leskinen et al. | |
| 2015/0087793 A1* | 3/2015 | Masino | C08F 4/6592 526/64 |
| 2017/0369612 A1 | 12/2017 | Dreng et al. | |
| 2018/0251584 A1 | 9/2018 | Cho et al. | |
| 2020/0207968 A1* | 7/2020 | Park | C08L 23/20 |

FOREIGN PATENT DOCUMENTS

| | | |
|---|---|---|
| CN | 102203139 A | 9/2011 |
| CN | 102428108 A | 4/2012 |
| JP | 2010523757 A | 7/2010 |
| JP | 2011503277 A | 1/2011 |
| JP | 2014503492 A | 2/2014 |
| KR | 100500802 B1 | 7/2005 |
| KR | 20060126590 A | 12/2006 |
| KR | 20140109417 A | 9/2014 |
| KR | 20170099694 A | 9/2017 |
| KR | 20170115494 A | 10/2017 |
| WO | 2010052267 A1 | 5/2010 |

OTHER PUBLICATIONS

Stienstra G J, et al., "Monitoring slurry-loop reactors for early detection of hydrodynamic instabilities", Chemical Engineering and Processing: Process Intensification, Elsevier Sequoia, Lausanne, CH, vol. 44, No. 9, Feb. 12, 2005 (Feb. 12, 2005), XP027608220, ISSN: 0255-2701 (200). pp. 959-968.
Extended European Search Report for Application No. 19885399.6 dated Jul. 9, 2021. 8 pgs.
International Search Report for Application No. PCT/KR2019/014922 dated Feb. 26, 2020, 3 pages.
Karjala, et al., "Real-Time Estimation of Polymer Properties in an Industrial Polyethylene Reactor," Proceedings of the American Control Conference, Jun. 1997, pp. 3063-3067.
Search Report dated Jul. 28, 2022 from the Office Action for Chinese Application No. 201980034040.9 issued Aug. 3, 2022, 2 pages.

* cited by examiner

*Primary Examiner* — Robert S Jones, Jr.
*Assistant Examiner* — Jiangtian Xu
(74) *Attorney, Agent, or Firm* — Lerner, David, Littenberg, Krumholz & Mentlik, LLP

(57) ABSTRACT

Provided is a method of predicting fouling during a process of preparing polyolefin. According to the present invention, occurrence of fouling may be predicted by calculating R value according to the following Equation 1 in real-time with high reliability during a copolymerization process of preparing polyolefin:

R (ratio of unreacted alpha-olefin comonomer to produced polyolefin polymer) =amount of unreacted alpha-olefin comonomer (unit: kg/hr) / amount of produced polyolefin polymer (unit: kg/hr)  [Equation 1]

Therefore, productivity of the polyolefin preparation process may be further increased.

7 Claims, No Drawings

METHOD OF PREDICTING FOULING IN POLYOLEFIN PREPARATION PROCESS

CROSS-REFERENCE TO RELATED APPLICATION

This application is a national phase entry under 35 U.S.C. § 371 of International Application No. PCT/KR2019/014922 filed Nov. 5, 2019, which claims priority from Korean Patent Application No. 10-2018-0138395 filed Nov. 12, 2018, all of which are incorporated herein by reference.

TECHNICAL FIELD

The present invention relates to a method of predicting fouling in a polyolefin preparation process.

BACKGROUND ART

Industrial methods of preparing polyolefin from olefin include a gas-phase polymerization process, a solution polymerization process, and a slurry polymerization process. In the gas-phase polymerization process, produced solids exist in a fluidized state in a gas phase without a separate polymerization medium. In the solution polymerization process, polymerization takes place in a state where polymers are melted in a liquid phase. In contrast, in the slurry polymerization process, produced polymers in a solid state are dispersed in a polymerization medium in a liquid phase. In the slurry polymerization process using the same, therefore, a fouling phenomenon occurs, in which polymers adhere to the inner walls of a reactor and a condenser during polymerization depending on polymerization conditions. This phenomenon makes the size and density of the resulting particles uneven, making heat transfer and heat removal in the reactor difficult, and also hinders even diffusion of the monomers, which in turn makes it impossible to control the polymerization reaction.

In general, the slurry polymerization process is carried out at a temperature lower than a melting point of a resulting polymer. When the temperature rises above the critical temperature due to several causes, the fouling phenomenon occurs in which the polymer particles become soft and adhere to the wall of the reactor. This phenomenon is affected by a polymerization medium, a molecular weight, a comonomer concentration, etc. In addition, fouling also occurs at a low temperature below the critical temperature. This phenomenon is worsened as the slurry concentration increases, and thus it is difficult to increase production efficiency.

Therefore, in order to prevent fouling, it is very important to monitor the occurrence of fouling during the polymerization process and to change operating conditions, in terms of productivity improvement.

However, it is difficult to monitor such a fouling phenomenon in real-time during the slurry polymerization process, and thus the time difference occurs when the fouling is recognized.

In other words, when a load of a slurry pump in the slurry polymerization reactor suddenly rises, fouling is recognized. Thus, fouling is only recognized after the fouling has occurred. In this case, operation of the reactor must be stopped, and therefore, it is impossible to predict fouling before the fouling occurs.

DISCLOSURE

Technical Problem

To solve the above-described problems, an object of the present invention is to provide a method of predicting occurrence of fouling in real-time during a copolymerization process of preparing polyolefin to increase productivity of the process.

Technical Solution

To achieve the above object, the present invention provides a method of predicting fouling during a process of preparing polyolefin, the method including the steps of:

feeding ethylene and alpha-olefin comonomer into a polymerization reactor;

copolymerizing the ethylene and alpha-olefin comonomer in the presence of a catalyst to prepare polyolefin; and calculating R value in real-time according to the following Equation 1 during the copolymerization:

$R$ (ratio of unreacted alpha-olefin comonomer to produced polyolefin polymer)=amount of unreacted alpha-olefin comonomer (unit: kg/hr)/amount of produced polyolefin polymer (unit: kg/hr).   [Equation 1]

Effect of the Invention

According to the present invention, occurrence of fouling may be predicted in real-time with high reliability during a copolymerization process of preparing polyolefin. Therefore, occurrence of fouling may be prevented by changing the process conditions in advance, before fouling occurs, thereby further increasing productivity of the polyolefin production process.

Further, the conditions may be applied to producing a polyolefin polymer as efficiently as possible without fouling.

DETAILED DESCRIPTION OF THE EMBODIMENTS

In the present invention, the terms "first", "second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics, numbers, steps, components, or combinations thereof, and do not exclude the existence or the possibility of addition of one or more different characteristics, numbers, steps, components, or combinations thereof beforehand.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, a method of predicting fouling according to a specific embodiment of the present invention will be described.

According to one specific embodiment of the present invention, provided is a method of predicting fouling during a process of preparing polyolefin, the method including the steps of:

feeding ethylene and alpha-olefin comonomer into a polymerization reactor;

copolymerizing the ethylene and alpha-olefin comonomer in the presence of a catalyst to prepare polyolefin; and calculating R value in real-time according to the following Equation 1 during the copolymerization:

R (ratio of unreacted alpha-olefin comonomer to produced polyolefin polymer)=amount of unreacted alpha-olefin comonomer (unit: kg/hr)/amount of produced polyolefin polymer (unit: kg/hr) [Equation 1]

Polyolefin, which is a resin obtained by polymerizing olefin monomers alone or copolymerizing two or more different olefin monomers in the presence of a catalyst such as a Ziegler-Natta catalyst or a metallocene catalyst, is used in various fields because of having excellent physical properties.

Industrial-scale processes of preparing polyolefins from olefins include a gas-phase polymerization process, a solution polymerization process, a slurry polymerization process, etc. In the gas-phase polymerization process, produced solids exist in a fluidized state in a gas phase without a separate polymerization medium. In the solution polymerization process, polymerization takes place in a state where polymers are melted in a liquid phase.

In contrast, in the slurry polymerization process, produced polymers in a solid state are dispersed in a polymerization medium in a liquid phase. In general, the slurry polymerization process is carried out at a temperature lower than a melting point of a resulting polymer. When the temperature rises above the critical temperature due to several causes, the fouling phenomenon may occur in which the polymer particles become soft and adhere to the wall of the reactor. This phenomenon is affected by a polymerization medium, a molecular weight, a comonomer concentration, etc. In addition, fouling also occurs at a low temperature below the critical temperature. This phenomenon is worsened as the slurry concentration increases, and thus it is difficult to increase production efficiency.

Therefore, in order to prevent the fouling phenomenon which occurs during the process, it is necessary to change the process conditions or to perform the polymerization process again after removing the fouling. However, it is difficult to monitor in real-time whether or not such a fouling phenomenon occurs during the slurry polymerization process, and thus the time difference occurs when the fouling is recognized, leading to reduction of production efficiency.

Accordingly, the present inventors have continued to study a method capable of predicting occurrence of fouling in real-time during a process of preparing polyolefin, and as a result, it was confirmed that a ratio of a weight of unreacted alpha-olefin comonomer to the amount of produced polyolefin is consistently correlated with fouling. Therefore, it was confirmed that, based on the ratio, occurrence of fouling may be predicted in real-time with reliability during the process of polymerizing polyolefin, thereby completing the present invention.

In a specific embodiment of the present invention, the target process is a copolymerization process of preparing polyolefin by copolymerizing ethylene and alpha-olefin comonomer in the presence of a catalyst.

More specifically, the polymerization process includes the steps of feeding ethylene and alpha-olefin comonomer into a polymerization reactor, and copolymerizing the ethylene and alpha-olefin comonomer in the presence of a catalyst to prepare polyolefin.

In one embodiment of the present invention, the polymerization reactor may be a slurry loop reactor. The slurry loop reactor is operated by releasing gas to the outside while feeding a slurry mixture into the reactor, and continuously discharging a polymerization product collected in the lower layer, i.e., the slurry mixture including polyolefin.

Further, in one embodiment of the present invention, the alpha-olefin comonomer may include one or more selected from the group consisting of propylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. More specifically, the alpha-olefin comonomer may be propylene, 1-butene, or 1-hexene, but the present invention is not limited thereto.

Further, in one embodiment of the present invention, the catalyst is not particularly limited, as long as it is applicable in the polyolefin polymerization process. The catalyst may be a Ziegler-Natta catalyst, a metallocene catalyst, a chromium catalyst, etc.

Further, the metallocene catalyst may be a supported metallocene catalyst in the form of one or more metallocene compounds supported on a carrier.

The carrier may be a carrier containing a hydroxyl group on the surface thereof, and preferably, a carrier having highly reactive hydroxyl group and siloxane group, of which surface is dried by removing water.

For example, the carrier may include high-temperature dried silica, silica-alumina, silica-magnesia, etc., which may commonly contain oxide, carbonate, sulfate, or nitrate components such as $Na_2O$, $K_2CO_3$, $BaSO_4$, $Mg(NO_3)_2$, etc.

As the polymerization proceeds, polyolefin is discharged from the polymerization reactor, and the production amount of the produced polyolefin polymer and the amount of unreacted alpha-olefin comonomer are used to calculate R value from the following Equation 1:

R (ratio of unreacted alpha-olefin comonomer to produced polyolefin polymer)=amount of unreacted alpha-olefin comonomer (unit: kg/hr)/amount of produced polyolefin polymer (unit: kg/hr) [Equation 1]

Further, the amount of the unreacted alpha-olefin comonomer may be calculated according to the following Equation 2, which indicates a correlation between a feeding amount of the alpha-olefin comonomer and a conversion ratio:

X (conversion ratio of alpha-olefin comonomer) =feeding amount of alpha-olefin comonomer (unit: kg/hr)−amount of unreacted alpha-olefin comonomer (unit: kg/hr)/feeding amount of alpha-olefin comonomer (unit: kg/hr) [Equation 2]

In other words, the conversion ratio of the alpha-olefin comonomer is determined as a predetermined value depending on the used catalyst, the kind of the comonomer, temperature and pressure of the reactor in the polyolefin polymerization process, and thus the amount of the unreacted alpha-olefin comonomer in the corresponding reaction may be calculated from the conversion ratio of the alpha-olefin comonomer and the feeding amount of the alpha-olefin comonomer.

Further, the amount of the unreacted alpha-olefin comonomer may be calculated inversely from the amount of fresh alpha-olefin comonomer that is re-injected to supplement the alpha-olefin comonomer and unreacted alpha-olefin comonomer which are consumed while being incorporated and copolymerized into the polyolefin polymer, as the polymerization process proceeds.

As a result of examining the correlation between the R value calculated by the above process and the fouling phenomenon, it was confirmed that fouling occurs when the R value exceeds 0.10, and fouling does not occur below 0.10.

This means that when the ratio of the weight of the unreacted alpha-olefin comonomer with respect to the weight of the polyolefin polymer produced per hour exceeds 0.10, the conversion ratio of the alpha-olefin comonomer to the output is low, and thus this may be because fouling occurs due to the relatively high concentration of the comonomer in the reactor.

In addition, as a result of verifying various polyolefin polymerization processes by applying various operating conditions of the polymerization reactor and the catalyst, it was proved that fouling predicted by the R value and fouling actually observed are highly reliable, regardless of the type of catalyst, the feeding amount of ethylene and alpha-olefin comonomer, the physical properties of the target polyolefin, the operating conditions of the reactor, etc.

For example, according to one embodiment of the present invention, X (conversion ratio of the alpha-olefin comonomer) according to Equation 2 may be 0.1 or more, or 0.2 or more, or 0.3 or more and 0.9 or less, or 0.8 or less, or 0.7 or less, but the present invention is not limited thereto. It was confirmed that fouling occurs when the R value exceeded 0.10, irrespective of the above-described range of the conversion ratio.

Further, the temperature during the copolymerization process may be about 25° C. to about 500° C., or about 25° C. to about 200° C., or about 50° C. to about 150° C. Further, the polymerization pressure may be about 1 Kgf/cm$^2$ to about 100 Kgf/cm$^2$, or about 1 Kgf/cm$^2$ to about 80 Kgf/cm$^2$, or about 5 Kgf/cm$^2$ to about 50 Kgf/cm$^2$. However, the present invention is not limited thereto, and it was confirmed that fouling occurs when the R value exceeds 0.10, irrespective of the above-described ranges of the temperature and the pressure.

Therefore, from the above R value, it is possible to predict occurrence of fouling in real-time during the polyolefin polymerization process, and accordingly, it is possible to quickly change the process conditions and to significantly reduce the cost and time required to prevent fouling.

In other words, when the R value exceeds 0.10, as calculated in real-time while performing the process of preparing polyolefin by copolymerizing the ethylene and alpha-olefin comonomer in the presence of a catalyst by feeding the ethylene and alpha-olefin comonomer into the polymerization reactor, fouling is predicted to occur soon, and therefore, fouling may be prevented in advance by reducing the feeding amount of alpha-olefin comonomer or by changing temperature and pressure conditions.

Further, when the R value is 0.10 or less, no fouling occurs, but the amount of the produced polyolefin polymer relative to the feeding amount of the alpha-olefin comonomer is considered low. For high productivity, the maximum production efficiency may be achieved by changing the reactor operating conditions until the R value reaches 0.1, rather than maintaining the R value too low.

That is, the R value may be used as a factor for producing the polyolefin polymer as efficiently as possible without the occurrence of fouling rather than simply a factor for predicting the occurrence of fouling.

Hereinafter, the present invention will be described in detail with reference to embodiments of the present invention. However, various modifications may be made to the embodiments disclosed herein, and the scope of the invention should not be construed as being limited to the embodiments described below.

EXAMPLE

Preparation Example of Catalyst

Preparation Example 1

A supported catalyst was prepared in the same manner as in Preparation Example 4 of Korean Patent Publication No. 2017-0099694.

Example of Polyolefin Polymerization

Examples 1 to 4

An isobutene slurry loop continuous polymerization reactor (reactor volume: 80 m$^3$) was used as a polymerization reactor. Ethylene gas, hydrogen gas, and a comonomer 1-hexene needed for polymerization were continuously fed thereto at a constant rate, and concentrations were examined by online chromatograph.

As a catalyst, the supported catalyst of Preparation Example 1 was used equally, and feeding was performed in the form of isobutene slurry, and the reactor was maintained at a pressure of 40 bar and a temperature of 84° C.

Polymerization conditions and physical properties of polyolefins are summarized in Table 1 below.

TABLE 1

|  | Example 1 | Example 2 | Example 3 | Example 4 |
|---|---|---|---|---|
| Feeding amount of ethylene (ton/hr) | 13.0 | 12.8 | 12.8 | 12.5 |
| Feeding amount of 1-hexene (kg/hr) | 2,253 | 2,380 | 2,440 | 2,460 |
| Density of slurry (kg/m$^3$)* | 551 | 557 | 553 | 559 |
| Settling efficiency (%) | 0.44 | 0.43 | 0.43 | 0.43 |
| Density of polyolefin (g/cm$^3$) | 0.9149 | 0.9152 | 0.9169 | 0.9155 |
| MI$_{2.16}$ | 1.1 | 1.5 | 1.2 | 1.1 |

*Densisty of slurry is a value measured by a densisty indicator installed in the polymerization reactor.

Further, the following values were calculated in real-time during polymerization reactions of Examples 1 to 4, and summarized in Table 2 below.

$F$ (feeding ratio of alpha-olefin comonomer to ethylene, unit: kg/ton):feeding amount of alpha-olefin comonomer (unit: kg/hr)/feeding amount of ethylene (unit: ton/hr)  (1)

$X$ (conversion ratio of alpha-olefin comonomer): feeding amount of alpha-olefin comonomer (unit: kg/hr)−amount of unreacted alpha-olefin comonomer (unit: kg/hr)/feeding amount of alpha-olefin comonomer (unit: kg/hr)  (2)

$R$ (ratio of unreacted alpha-olefin comonomer to produced polyolefin polymer):amount of unreacted alpha-olefin comonomer (unit: kg/hr)/amount of produced polyolefin polymer (unit: kg/hr)     (3)

(4) Occurrence of fouling: Occurrence of fouling was determined by examining whether a load of a slurry pump abruptly raised during operation.

TABLE 2

| | Example 1 | Example 2 | Example 3 | Example 4 |
|---|---|---|---|---|
| F (unit: kg/ton) | 174 | 186 | 191 | 197 |
| X | 0.52 | 0.48 | 0.47 | 0.44 |
| R | 0.076 | 0.091 | 0.095 | More than 0.10 |
| Fouling | Not Occurred | Not Occurred | Not Occurred | Occurred |

Referring to Tables 1 and 2, R values were calculated in real-time while polymerizing polyolefins under various operating conditions using the slurry loop reactor, and it was observed whether fouling occurred or not.

As a result, Example 4, in which the R value exceeds 0.1, showed occurrence of fouling, and therefore, it is expected that the method of predicting fouling of the present invention may be practically applied to actual processes with high reliability.

The invention claimed is:

1. A method of preventing fouling during a process of preparing polyolefin, the method comprising the steps of:
feeding ethylene and alpha-olefin comonomer into a polymerization reactor;
copolymerizing the ethylene and alpha-olefin comonomer in the presence of a catalyst to prepare polyolefin; and
maintaining R value in real-time according to the following Equation 1 during the copolymerization to be 0.10 or less by reducing a feeding amount of the alpha-olefin comonomer or by changing temperature and pressure conditions of the copolymerization:

$R$ (ratio of unreacted alpha-olefin comonomer to produced polyolefin polymer)=amount of unreacted alpha-olefin comonomer (unit: kg/hr)/amount of produced polyolefin polymer (unit: kg/hr)     [Equation 1]

wherein the amount of the unreacted alpha-olefin comonomer is calculated using the following Equation 2:

$X$ (conversion ratio of alpha-olefin comonomer)=feeding amount of alpha-olefin comonomer (unit: kg/hr)−amount of unreacted alpha-olefin comonomer (unit: kg/hr)/feeding amount of alpha-olefin comonomer (unit: kg/hr),     [Equation 2]

wherein the X (conversion ratio of alpha-olefin comonomer) determined by Equation 2 is 0.1 to 0.9.

2. The method of predicting fouling of claim 1, wherein the polymerization reactor is a slurry loop reactor.

3. The method of predicting fouling of claim 1, wherein the alpha-olefin comonomer includes one or more selected from the group consisting of propylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene.

4. The method of predicting fouling of claim 3, wherein the alpha-olefin comonomer includes one or more selected from the group consisting of propylene, 1-butene, and 1-hexene.

5. The method of predicting fouling of claim 1, wherein the catalyst is a Ziegler-Natta catalyst, a metallocene catalyst, or a chromium catalyst.

6. The method of predicting fouling of claim 1, wherein the catalyst is a supported metallocene catalyst.

7. The method of predicting fouling of claim 1, wherein the copolymerization step is performed at a temperature of 25° C. to 500° C. and a pressure of 1 Kgf/cm$^2$ to 100 Kgf/cm$^2$.

* * * * *